(12) United States Patent
Rigby (10) Patent No.: US 10,883,802 B2
(45) Date of Patent: Jan. 5, 2021

(54) WEAPON SYSTEM

(71) Applicant: BAE Systems plc, London (GB)

(72) Inventor: Keith Antony Rigby, Preston (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 16/614,627

(22) PCT Filed: May 31, 2018

(86) PCT No.: PCT/GB2018/051491
§ 371 (c)(1),
(2) Date: Nov. 18, 2019

(87) PCT Pub. No.: WO2018/220382
PCT Pub. Date: Dec. 6, 2018

(65) Prior Publication Data
US 2020/0096296 A1    Mar. 26, 2020

(30) Foreign Application Priority Data

Jun. 2, 2017  (EP) ..................................... 17174333
Jun. 2, 2017  (GB) ................................... 1708822.0

(51) Int. Cl.
*F41H 13/00* (2006.01)
*F41G 3/06* (2006.01)

(52) U.S. Cl.
CPC ........... *F41H 13/005* (2013.01); *F41G 3/065* (2013.01)

(58) Field of Classification Search
CPC .... F41H 13/00; F41H 13/0043; F41H 13/005; F41H 13/0062; F41H 13/0075
See application file for complete search history.

(56) References Cited

U.S. PATENT DOCUMENTS

| 5,202,783 A | 4/1993 | Holland et al. |
| 5,747,720 A | 5/1998 | Schnurr et al. |
| 5,818,649 A * | 10/1998 | Anderson .............. G02B 17/00 359/726 |

(Continued)

FOREIGN PATENT DOCUMENTS

| EP | 0892240 A2 | 1/1999 |
| EP | 3081895 A1 | 10/2016 |

(Continued)

OTHER PUBLICATIONS

PCT Search Report for Appl No. PCT/GB2018/051490 dated Aug. 3, 2018, 17 pages.

(Continued)

*Primary Examiner* — Joshua E Freeman
(74) *Attorney, Agent, or Firm* — Maine Cemota & Rardin (57) ABSTRACT

According to an aspect of the invention, there is provided a laser weapon system, comprising: one or more lasers for generating electromagnetic radiation; laser optics for routing the electromagnetic radiation to laser apertures in the platform which direct the generated electromagnetic radiation at a target, the laser apertures having an associated field of regard; and a control system, the control system being arranged to control which combination of laser, laser optics and laser aperture is used to engage the target, based on a probability of successfully engaging that target in relation to the field of regard of the laser aperture of the combination.

10 Claims, 3 Drawing Sheets

(56) References Cited

U.S. PATENT DOCUMENTS

| | | | |
|---|---|---|---|
| 6,359,681 B1* | 3/2002 | Housand | G01S 17/86 |
| | | | 356/4.01 |
| 7,446,315 B1 | 11/2008 | Tidwell | |
| 8,279,429 B2 | 10/2012 | Aphek et al. | |
| 9,170,069 B1 | 10/2015 | Smith | |
| 9,321,128 B2* | 4/2016 | Bradley | F41H 13/0062 |
| 10,095,016 B2* | 10/2018 | Karlsen | G02B 19/0052 |
| 10,337,841 B2* | 7/2019 | Segev | H01S 3/2383 |
| 2004/0200341 A1* | 10/2004 | Walters | F41H 13/0062 |
| | | | 89/1.13 |
| 2005/0065668 A1* | 3/2005 | Sanghera | G01S 7/495 |
| | | | 701/3 |
| 2007/0040725 A1* | 2/2007 | Lowell | F41C 7/00 |
| | | | 342/13 |
| 2007/0236382 A1* | 10/2007 | Dove | G01S 7/495 |
| | | | 342/14 |
| 2008/0018520 A1 | 1/2008 | Moreau | |
| 2009/0052475 A1* | 2/2009 | Nachshon | F41H 11/32 |
| | | | 372/6 |
| 2010/0126335 A1* | 5/2010 | Saban | F41H 13/0056 |
| | | | 89/36.01 |
| 2010/0282942 A1* | 11/2010 | Mosier | F41H 13/005 |
| | | | 250/203.2 |
| 2011/0036998 A1 | 2/2011 | Bradley | |
| 2011/0113949 A1* | 5/2011 | Bradley | F41H 13/0056 |
| | | | 89/1.11 |
| 2012/0101658 A1* | 4/2012 | Bradley | G01S 3/782 |
| | | | 701/2 |
| 2012/0292481 A1* | 11/2012 | Hutchin | G01S 17/89 |
| | | | 250/201.9 |
| 2013/0140283 A1* | 6/2013 | Bradley | A61K 31/7105 |
| | | | 219/121.62 |
| 2014/0209678 A1* | 7/2014 | Factor | G01S 7/38 |
| | | | 235/400 |
| 2016/0097616 A1* | 4/2016 | Weigold | F41H 13/0062 |
| | | | 250/396 R |
| 2017/0234658 A1* | 8/2017 | Segev | F41H 13/0062 |
| | | | 250/203.2 |
| 2018/0080747 A1* | 3/2018 | Nishikata | H05H 1/24 |

FOREIGN PATENT DOCUMENTS

| | | |
|---|---|---|
| FR | 3039287 A1 | 1/2017 |
| GB | 2565200 A | 2/2019 |
| GB | 2565403 A | 2/2019 |
| WO | 9721261 A1 | 6/1997 |
| WO | 2008062401 A1 | 5/2008 |

OTHER PUBLICATIONS

PCT Search Report for Appl No. PCT/GB2018/051491 dated Aug. 8, 2018, 16 pages.
European Extended Search Report for Appl No. 17174340.4 dated Nov. 15, 2017, 9 pages.
European Extended Search Report for Appl No. 17174333.9 dated Nov. 17, 2017, 9 pages.
Great Britain Search Report for Appl No. 1708831.1 dated Nov. 30, 2017, 3 pages.
Great Britain Search Report for Appl No. 1708822.0 dated Nov. 28, 2017, 3 pages.
Great Britain Combined Search Report and Examination Report for Appl No. 1808979.7 dated Dec. 4, 2018, 5 pages.
Michael Lavan et al: "Directed energy technology overview", Pulsed Power Conference (PPC), 2011 IEEE, Jun. 19, 2011, pp. 1-45, XP032173078, DOI: 10.1109/PPC.2011.6191690, ISBN: 978-1-4577-0629-5.
International Preliminary Report on Patentability for Appl No. PCT/GB2018/051490 dated Dec. 3, 2019, 10 pages.
International Preliminary Report on Patentability for Appl No. PCT/GB2018/051491 dated Dec. 3, 2019, 9 pages.
Great Britain Combined Search Report and Examination Report for Appl No. 1808983.9 dated Nov. 30, 2018, 5 pages.
Office Action for U.S. Appl. No. 16/616,035, dated Aug. 31, 2020, 24 Pages.

* cited by examiner

WEAPON SYSTEM

RELATED APPLICATIONS

This application is a national phase application filed under 35 USC § 371 of PCT Application No. PCT/GB2018/051491 with an International filing date of May 31, 2018, which claims priority of GB Patent Application 1708822.0 filed on Jun. 2, 2017 and EP Patent Application 17174333.9 filed on Jun. 2, 2017. Each of these applications is herein incorporated by reference in its entirety for all purposes.

FIELD

The present invention relates generally to a weapon system, and in particular a laser weapon system. The present invention also relates generally to related control systems and methods.

BACKGROUND

In recent years, laser weapon systems have gone from being theoretically possible to realistic and practical implementations. Recent advances in laser technology have allowed laser weapon systems to become relatively portable, whilst still powerful enough to successfully engage targets.

Whilst the recent development in laser weapon systems has been both significant and impressive, the developments have largely been focussed on technology underpinning the size, portability, power and other intrinsic properties of a single laser weapon system. A single laser weapon system typically comprises one or more lasers coupled to a single dedicated set of laser optics for directing electromagnetic radiation (e.g. a laser beam) from a laser aperture to a target. In other words, thoughts on, and development of, interaction between multiple lasers, laser optics and/or laser apertures has not been contemplated or developed, or at least contemplated and/or developed to the extent of the technology underpinning a single laser weapon system comprising one or more lasers coupled to a single dedicated set of laser optics. While, of course, development of intrinsic technology underpinning a system comprising one or more lasers and a single dedicated set of laser optics is important, so is the development of how multiple lasers and multiple sets of laser optics for optionally engaging one or more different targets, or better engaging a single target, is also important. This is particularly so for any practical implementation of a useful, practical laser weapon system.

SUMMARY

It is an aim of example embodiments to at least partially overcome or avoid one more disadvantages of the prior art, described above or elsewhere, or to at least provide an improved or even an alternative laser weapon system to those already in existence.

According to a first aspect of the invention, there is provided a laser weapon system, comprising: a laser for generating electromagnetic radiation; laser optics for directing the generated electromagnetic radiation via one of a plurality of laser apertures; a plurality of laser apertures, each having an associated field of regard, and each being a final optical element in the laser weapon system through which the generated electromagnetic radiation exits the weapon; and a control system, the control system being arranged to control which combination of laser, laser optics and laser aperture the generated electromagnetic radiation is directed to engage a target, based on a probability of successfully engaging that target in relation to the field of regard of a given laser aperture of the combination.

The control system may be arranged to control through which combination of laser optics and laser aperture the generated electromagnetic radiation is directed to engage the target, based on an increased or maximised probability of successfully engaging that target in relation to the field of regard of the laser aperture of the combination, when compared with one or more other laser apertures of the laser weapon system.

The laser weapon system may comprise multiple lasers, and the control system may be arranged to determine through which combination of laser, laser optics and laser apertures the generated electromagnetic radiation is routed d to engage the target by determining which assembly is to be used, based on a probability of successfully engaging that target in relation to the field of regard of the laser aperture of the combination.

The control system may be arranged to route generated electromagnetic radiation to a particular set of laser apertures.

The control system may be arranged to route generated electromagnetic radiation to a particular of laser aperture via the use of one or more moveable optical components.

In order to determine the probability, the control system may be arranged to receive sensory input from one or more sensors located proximate to the laser weapon system.

In order to determine the probability, the control system may be arranged to receive sensory input from one or more sensors of a platform which the laser weapon system forms a part of, or which the laser weapon system is connected to.

In order to determine the probability, the control system may be arranged to receive sensory input from one or more sensors located remote from the laser weapon system.

In order to determine the probability, the control system may be arranged to receive sensory input from one or more sensors separate to a platform which the laser weapon system forms a part of, or separate to a platform which the laser weapon system is connected to.

The probability of successfully engaging that target may be calculated by the controller.

The probability of successfully engaging that target may be based on one or more of, or a combination of: position and/or dynamics of a platform which the laser weapon system forms a part of, or which the laser weapon system is connected to; and/or position and/or dynamics of the target; and/or position and/or dynamics of one or more friendly assets; and/or position and/or dynamics of one or more non-combatants; and/or the position of environmental features such as terrain.

The control system may be arranged to monitor (in real-time) a three-dimension position of an object other than the target, and to control a mask to prevent generated electromagnetic radiation being directed at that object.

According to a second aspect of the invention, there is provided a control system for use with a laser weapon system, the laser weapon system comprising: a laser for generating electromagnetic radiation; laser optics for directing the generated electromagnetic radiation via one of a plurality of laser apertures; a plurality of apertures, each having an associated field of regard, and each being a final optical element in the laser weapon system through which the generated electromagnetic radiation exits the weapon; and the control system is arranged to control through which combination of laser optics and laser aperture the generated electromagnetic radiation is directed to engage a target, based on a probability of successfully engaging that target in relation to the field of regard of the laser aperture of the combination.

According to a third aspect of the invention, there is provided a method of controlling a laser weapon system, the laser weapon system comprising: a laser for generating electromagnetic radiation; laser optics for directing the generated electromagnetic radiation via one of a plurality of apertures; a plurality of apertures, each having an associated field of regard, and each being a final optical element in the laser weapon system through which the generated electromagnetic radiation exits the weapon;

and the method comprising: controlling through which combination of laser optics and laser aperture the generated electromagnetic radiation is directed to engage a target, based on a probability of successfully engaging that target in relation to the field of regard of the laser aperture of the combination.

According to a fourth aspect of the invention, there is provided a laser weapon system, comprising: one or more lasers for generating electromagnetic radiation; laser optics for directing the generated electromagnetic radiation at a target via a laser aperture; a laser aperture, being a final optical element in the laser weapon system through which the generated electromagnetic radiation exits the weapon; and a control system, the control system being arranged to monitor the three-dimensional position of an object other than the target, and to control a mask to prevent generated electromagnetic radiation being directed at that object.

The control system may be arranged to allow the target to be continuously engaged unless and until the object other that the target is: close to being located in-between the laser aperture and the target; and/or in-between the laser aperture and the target, at which point the object is masked to prevent generated electromagnetic radiation being directed at that object.

The mask may be a real-time three-dimensional representation of the real world (i.e. a virtual mask).

The mask may be a virtual mask in that the controller is arranged to prevent one or more lasers from generating electromagnetic radiation in order to prevent generated electromagnetic radiation being directed at that object other that the target, as opposed to already generated electromagnetic radiation being physically blocked or otherwise physically deflected.

The mask may be a virtual mask in that the controller is arranged to engage a new target when an existing target is masked.

The mask may be a physical mask for physically blocking or otherwise physically deflecting already generated electromagnetic radiation towards another target or a safe location, in order to prevent generated electromagnetic radiation being directed at the object other than the target.

The object other than the target may be fixed in position relative to at least a part of the one or more lasers, or at least a part of the laser aperture.

The object may be a platform which the laser weapon system forms a part of, or which the laser weapon system is connected to.

The object other than the target may be moveable in position relative to the laser aperture.

The object other than the target may comprise: one or more friendly assets; and/or one or more non-combatants; and/or one or more environmental features.

The mask may be dynamically adjusted to take into account: movement of the target and/or the object other than the target; and/or movement of the laser apertures; and/or a platform to which the laser system is connected, or which the laser system forms a part of.

In order to determine the mask, the control system may be arranged to receive sensory input from one or more sensors located proximate to the laser weapon system. The one or more sensors may be sensors of a platform which the laser weapon system forms a part of, or which the laser weapon system is connected to.

In order to determine the mask, the control system may be arranged to receive sensory input from one or more sensors located remote from the laser weapon system. The one or more sensors may be sensors separate to a platform which the laser weapon system forms a part of, or separate to a platform which the laser weapon system is connected to.

The mask may be calculated by the controller. The mask may be based on one or more of, or a combination of: position and/or dynamics of a platform which the laser weapon system forms a part of, or which the laser weapon system is connected to; and/or position and/or dynamics of the target; and/or position and/or dynamics of one or more friendly assets; and/or position and/or dynamics of one or more non-combatants; and/or the position of environmental features.

According to a fifth aspect of the invention, there is provided a control system for a laser weapon system, the control system being arranged to monitor a real-time three-dimensional position of an object other than a target of the laser weapon system, and to use a mask to prevent generated electromagnetic radiation being directed at that object.

The control system may use the control mask to direct generated electromagnetic radiation towards another target or a safe location.

According to a sixth aspect of the invention, there is provided a method of controlling a laser weapon system, comprising monitoring a real-time three-dimensional position of an object other than a target of the laser weapon system, and to mask that object to prevent generated electromagnetic radiation being directed at that object.

The method may comprising using a control mask to direct generated electromagnetic radiation towards another target or a safe location.

It will be appreciated from the above, and the more detailed embodiments below, that one or more features from one aspect can be combined with and/or replace one or more features of another aspect, unless such combination or replacement would be mutually exclusive from the understanding of the skilled person after a reading of this entire disclosure.

BRIEF DESCRIPTION OF THE DRAWINGS

For a better understanding of the invention, and to show how embodiments of the same may be carried into effect, reference will now be made, by way of example, to the accompanying diagrammatic Figures in which.

DETAILED DESCRIPTION

Figure 1:
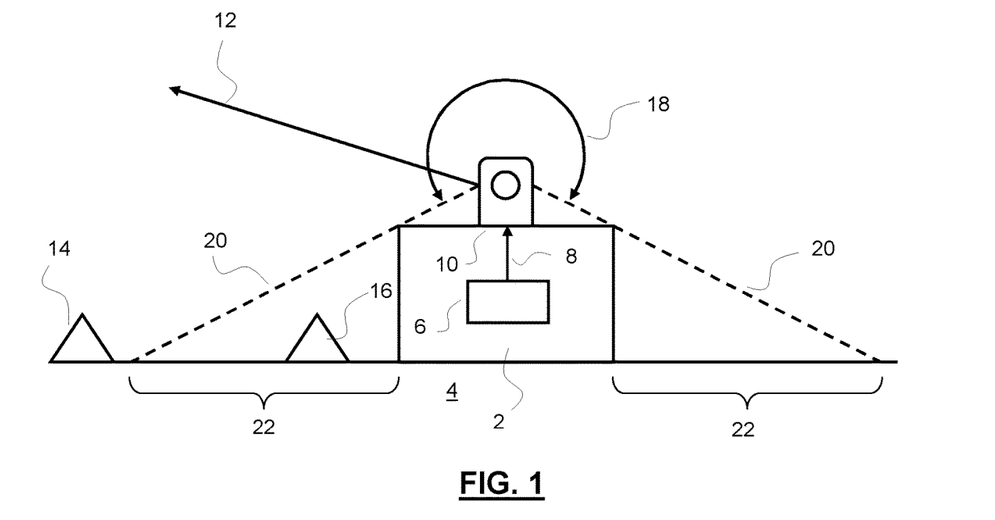
FIG. 1 schematically depicts a proposed laser weapon.

FIG. 1 schematically depicts a platform 2 provided with a laser weapon system. The platform 2 could be any object or structure useful for the particular application, and capable of carrying or otherwise being connected to a laser weapon system. For instance, the platform 2 could be a military vehicle, such as a land-based vehicle, or a naval vessel, or even an aircraft. The platform could be static (e.g. being a building or other structure) or be moveable. In this particular example, and strictly by way of example only, the platform 2 is a naval vessel located in a body of water 4, for example a sea or ocean.

In this particular example, the platform 2 houses a laser 6. The laser 6 is connected by one or more conduits or guides, for example optical fibres or waveguides 8, to laser optics 10. The laser optics 10 are for directing generated electromagnetic radiation 12 (e.g. laser energy or a laser beam) at a target 14, 16.

Details of the laser 6 and laser optics 10 are not provided herein, because such details are not necessary for understanding of the concepts described herein. That is, existing lasers and existing laser optics could be used to implement the inventive concept described further below. It is the control of the lasers or laser optics which is most important for the concepts according to example embodiments.

Returning to FIG. 1, the laser optics 10 may be housed in, or be, a turret or other structure. Sometimes, the laser optics 10 might be described as comprising (which includes being) a laser aperture, the aperture being a final optical element in the laser weapon system through which electromagnetic radiation exits the weapon. "Laser optics" is the term used generally herein to describe one or more optical components that are used to direct generated electromagnetic radiation at a target via a laser aperture.

The laser optics 10 shown in FIG. 1 will be movable such that the laser optics (and aperture) 10 has a general field of a regard 18. This field of regard 18 is understood to include the entire possible view or targeting space possible via movement of the laser optics 10, to engage a target 14, 16. The laser optics 10 is typically provided with one or more mechanical stops or similar which limit 20 the field of regard 18 to prevent the laser optics inadvertently directing electromagnetic radiation at the platform 2.

In general, the laser weapon system of FIG. 1 may work satisfactorily in most circumstances. However, improvements are indeed possible. For instance, it can be seen in FIG. 1 that two targets are shown 14, 16. One target 14 is within the field of regard 18 of the laser optics 10. However, another target 16 is not within the field of regard 18, and is instead within a range 22 of the platform 2 that simply cannot be targeted or otherwise engaged by the laser weapon system, or more particularly the laser optics 10 of that system.

Ideally, the range 22 within which a target (e.g. target 16) cannot be engaged should be as small as possible, so as to increase the probability of being able to successfully engage a target in the vicinity, and in particular, close vicinity if needed, of the platform 2 comprising or in connection the laser weapon system. In accordance with the example embodiments, these problems can be overcome by providing one or more lasers for generating electromagnetic radiation, and laser optics (which includes one or more components) for directing the generated electromagnetic radiation at a target via a laser aperture. Key is that the weapon system comprises a control system, where the control system is arranged to control which combination of laser, laser optics and laser aperture is used to engage the target. Importantly, the control system decides which combination to use based on a probability of successfully engaging the target in relation to the field of regard of the laser aperture of the combination. This approach allows multiple lasers, laser optics and laser apertures to be more efficiently and effectively managed and used, which not only allows for a target to be engaged more efficiently and efficiently in general, but can also allow for the laser weapon system to efficiently and effectively engage targets closer to a platform comprising the laser weapon system.

Figure 2:
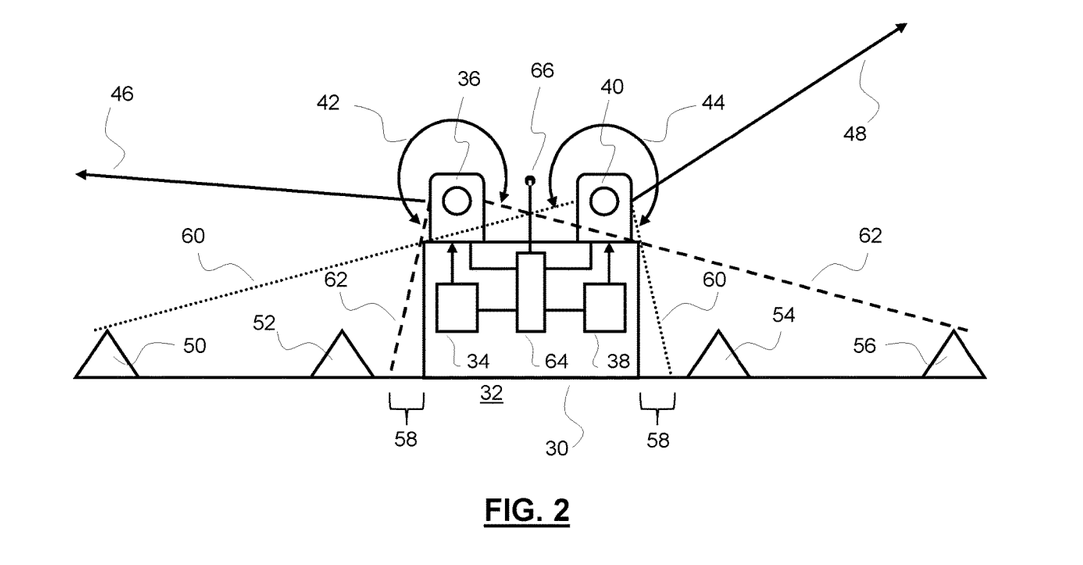
FIG. 2 schematically depicts a laser weapon system according to an example embodiment.

FIG. 2 schematically depicts a platform 30, for example in the form of a naval vessel, located on a body of water 32. The platform 30 comprises a laser weapon system according to an example embodiment.

The laser weapon system comprises a first laser 34 for generating electromagnetic radiation for use by a first set of dedicated laser apertures 36. The system also comprises a second laser 38 for generating electromagnetic radiation for use by a second dedicated set of laser apertures 40.

Much as with the existing system of FIG. 1, FIG. 2 shows that each set of laser apertures 36, 40 has an associated field of regard 42, 44 within which the respective laser apertures 36, 40 can direct electromagnetic radiation 46, 48 (e.g. laser energy or a laser beam) at one or more targets 50, 52, 54, 56.

It can already be seen that distributing sets of laser apertures 36, 40 about the platform 30 means that the minimum range 58 within which targets 50, 52, 54, 56 can be successfully engaged is significantly reduced with respect to the existing systems, for example as shown in FIG. 1. This is because the fields of regard 42, 44 associated with the laser apertures 36, 40 will have different physical stops and therefore different limits 60, 62 to the fields of regards 42, 44.

As shown in FIG. 2, while the combined fields of regard 42, 44 mean that coverage is increased around and about the platform 30, successfully engaging a target 50, 52, 54, 56 around and about the platform 30 is not straightforward. For example, even in the simplistic view shown in FIG. 2, it can be seen that targets 50, 52 are not within the field of regard 44 of laser aperture 40. At the same time, targets 54, 56 are indeed within the field of regard 44 of laser aperture 40. The reverse or opposite is true of the field of regard 42 of laser aperture 36. So, without careful management of the laser apertures 42, 44 and associated lasers 34, 38, a target could approach the platform without being engaged. In fact, depending on how the laser apertures 36, 40 and associated lasers 34, 38 are controlled in combination (i.e. holistically), a target could in theory get closer to the platform 30 of FIG. 2 than the platform of FIG. 1, due to the different fields of regard of respective laser apertures.

Importantly, then, the laser weapon system of FIG. 2 also comprises a control system 64. The control system 64 is arranged to control which combination of laser optics, laser apertures 36, 40 and associated lasers 34, 38 is used to engage a particular target 50, 52, 54 56. The control is not arbitrary, but is instead based on a probability of successfully engaging a particular target in relation to the field of regard of the laser apertures 36, 40 of the combination.

In some instances, the probability determination could be rather simplistic, for example being either certain (at least in terms of targeting) or zero. This is clearly visible in FIG. 2, and as already described above, where laser aperture 36 cannot possibly engage target 54, 56, whereas laser aperture 40 can engage target 54, 56. So, in this situation, in combination with appropriate sensing 66, the controller will be able to readily determine which combination of laser 34, 38 and laser apertures 36, 40 has the highest probability of successfully engaging the targets 50, 52, 54, 56. That is, when comparing the probability of laser aperture 36 engaging targets 54, 56 with the probability of laser aperture 40 engaging targets 54, 56, it will be quickly and readily apparent that an increased or maximised probability of engagement is possible with laser aperture 40.

In FIG. 2, one or more lasers may direct or otherwise provide electromagnetic radiation to a single set of dedicated optics. Together, this might form a laser-optics assembly, and, as shown in FIG. 2, the control system 64 can determine or otherwise calculate which assembly is better used to engage a particular target 50, 52, 54 56. As described further below, different ways of achieving combinations of laser, laser optics and laser apertures are possible, depending on how the laser weapon system is set up or configured. That is, it may not be necessary to have a dedicated laser system for a dedicated set of laser apertures.

As shown in FIG. 2, in order to determine the probability of engaging a target, the control system 64 is arranged to receive sensory input from one or more sensors 66 located proximate to the laser weapon system, and in this case by one or more sensors 66 that form part or are otherwise connected to the platform 30 itself. It will be readily envisaged what sort of form the sensors might take, or be otherwise associated with for receiving sensory data, for example different forms of radar, audio, visual, global positioning systems, or similar, and potentially even feedback from users of the platform, for example in terms of which particular target or targets is or are to be engaged. So, a sensor includes a user input unit, or user interface. In alternative or additional examples, however, the control system 64 may be arranged to receive sensory input from one or more sensors located remote from the laser weapon system, for example from one or more sensors which are separate to the laser weapon system 64 and/or platform 30. For instance, such remote sensory information may be provided by one or more friendly assets, in the form of one more remote platforms or similar which might assist in providing targeting information or similar. These could be other vessels, vehicles, structures, users or similar that can communicate with the platform that comprises the laser weapon system.

As discussed above, the determination of the probability of successfully engaging a target might be a relatively simple calculation, and can simply be a case of whether or not a target can actually be engaged at all by the laser apertures of a particular combination or assembly of the laser-optics. Sometimes, though, the calculation may be more complex or sophisticated, and/or dynamic in nature, for example being repeatedly updated to determine which of multiple laser apertures are used to engage the target, possibly with the same or different combinations being used in parallel or in succession. For instance, the probability for successfully engaging the target that is calculated (or possibly received) by the controller might optionally be based on one or more of, or a combination of: position and/or dynamics of the platform which the laser weapon system forms a part of, or which the laser weapon system is connected to; and/or position and/or dynamics of the target; and/or position and/or dynamics of one or more friendly assets; and/or position and/or dynamics of one or more non-combatants. For example, if there is relative movement between the platform and the target, then even though the target could be successfully engaged for a short period of time by particular laser-aperture, it might well be calculated that a different laser aperture, could, based on the current dynamics of the target, successfully engage the target for a longer period of time. That time could be a time necessary to disable or otherwise neutralise the target. Such calculations of probability may be based mainly on relatively straightforward geometry or similar, possibly in combination with data associated with the laser weapon system and/or target in terms of time for which the target has to be successfully engaged in order to satisfactorily neutralise the target or otherwise reach a satisfactory conclusion with respect to that target. So, it could easily be envisaged that over a period of time, different combinations laser optics and laser apertures are used to engage the same target at the same time, or in succession, as to the target moves around and about the platform, or the platform moves around and about the target. The control system will ensure that the target is engaged in the most effective manner.

It will be appreciated that with multiple laser apertures being controlled at any one time, and in a dynamic environment, the risks of inadvertently directing electromagnetic radiation at the platform itself, or a friendly asset or non-combatant, could be significantly increased. Therefore, and as described in more detail further below, the control system may be arranged to monitor a three-dimensional position of an object other than the target, and control a mask (e.g. physical or virtual) to prevent generated electromagnetic radiation being directed at that object. Such a simple but effective implementation may vastly improve the effectiveness and/or safety of the laser weapon system as a whole.

Figure 3:
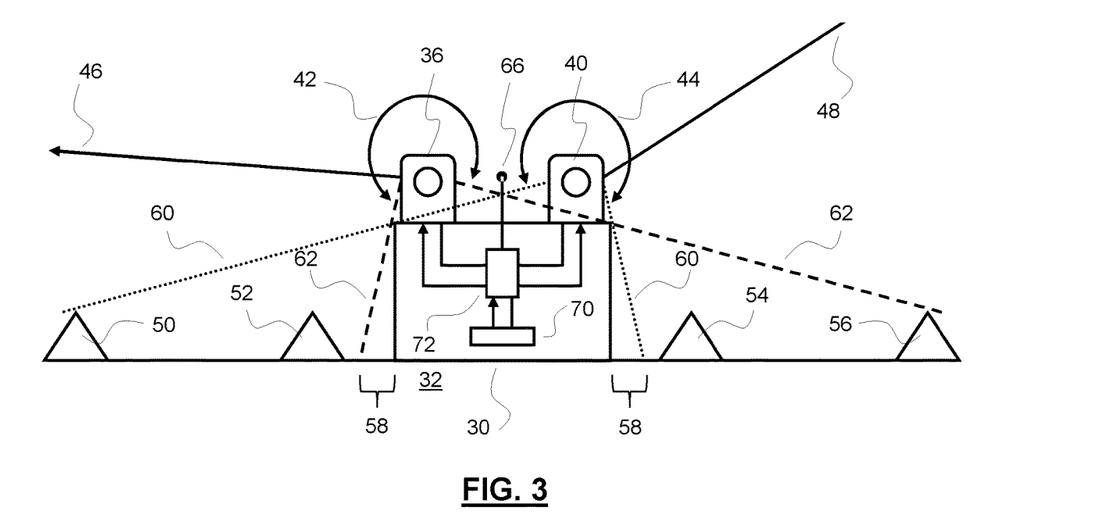
FIG. 3 schematically depicts a laser weapon system according to another example embodiment.

As discussed above in relation to FIG. 2, each of one or more dedicated lasers may be associated with a dedicated set of laser optics and laser apertures for directing generated electromagnetic radiation at a single target. There may be more than one set of dedicated assemblies on any given platform, in order to improve coverage around and about the platform as already discussed. Other implementations are, of course, possible. As shown now in FIG. 3, the setup of the laser weapon system is slightly different to that shown in and described with reference to FIG. 2. The same features appearing in FIGS. 2 and 3 are given the same reference numerals, for brevity and simplicity. In FIG. 3, the different sets of laser apertures 36, 40 are still provided on the platform 30. However, instead of these laser apertures 36, 40 each being fed with one or more dedicated lasers, FIG. 3 shows that a single set or grouping of one or more lasers 70 is controlled by a control system 72 to be appropriately routed to the one or more laser apertures 36, 40. So, in this particular example, instead of the control system 72 deciding which assembly of laser-laser optics (i.e. laser, laser optics and laser aperture) to use, the control system 72 decides through which laser apertures 36, 40 generated electromagnetic radiation should be directed or otherwise routed to, for engaging a target.

In some examples, the arrangement of FIG. 2 may be preferable, in that it may be possible, or easier, to simultaneously engage multiple targets with multiple laser apertures, since each set of laser apertures can be appropriately fed or provided with generated electromagnetic radiation for engaging that target. In another scenario, the arrangement of FIG. 3 may be preferable, in that fewer lasers may be required in order to satisfactorily feed or provide the laser apertures with generated electromagnetic radiation, thereby reducing the cost, weight, complexity, and so on of the system as a whole. It will be appreciated that, in some examples, there may be a combination of dedicated laser-laser aperture assemblies (e.g. such as in FIG. 2) and then a system where the number of sets of laser apertures is greater than the number of lasers or laser groups that could satisfactorily provide generated electromagnetic radiation to those laser apertures for engaging a target. For example, FIGS. 2 and 3 could represent different parts of the same platform. This combination might improve the flexibility of use of a system as whole.

Figures 4, 5:
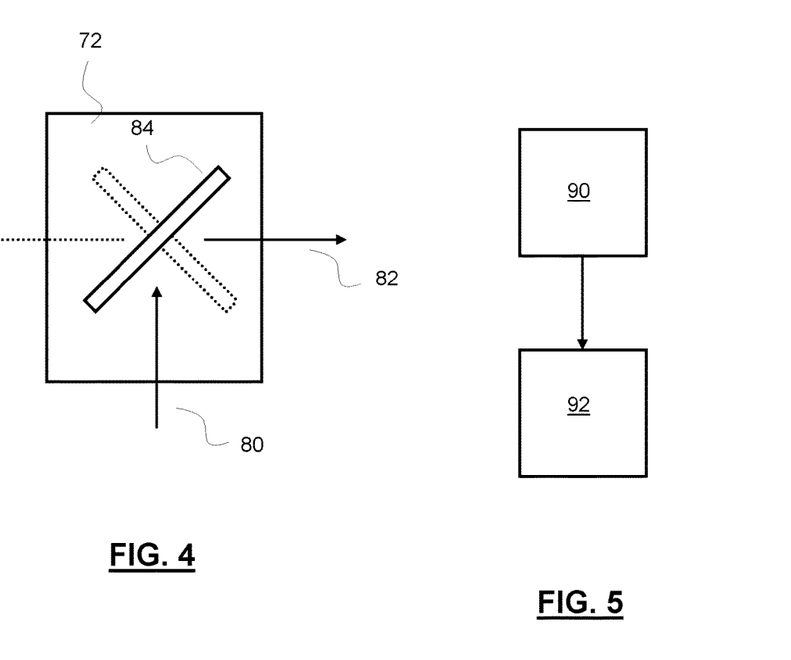
FIG. 4 schematically depicts routing of electromagnetic radiation, for use in the embodiment of FIG. 3.
FIG. 5 schematically depicts example methodology according to an example embodiment.

FIG. 4 shows how the control system 72 may appropriately route generated electromagnetic radiation 80 in a particular direction 82, for example to a particular laser aperture. In particular, one or more optical components 84 might be provided which are able to be controlled to appropriately route the electromagnetic radiation 80, 82 from a laser to any of the provisioned laser apertures. Typically, the component 84 or components will be movable to achieve this routing, for example being in the form or a movable or steerable mirror or prism or similar.

As described above, an entire laser weapon system has been described as being provided. However, it will also be appreciated that an existing laser weapon system might be improved via the control and control systems described above. That is, an existing laser weapon system might have its control system replaced with the sort of controls as described above to improve the operation of that laser system.

FIG. 5 describes general methodology associated with example embodiments. The methodology is for a laser weapon comprising one or more lasers for generating electromagnetic radiation, and laser optics for routing the generated electromagnetic radiation through an aperture, at a target, the laser aperture having an associated field of regard. The method might comprise controlling which combination of laser, laser optics and laser aperture is used to engage a target, based on a probability of successfully engaging that target in relation to the field of regard of the laser aperture of the combination 90. The method might further comprise controlling the laser weapon system to engage the target with that combination 92.

It has already been described above that a laser weapon system may track a target in order to successfully engage with and neutralise or otherwise reach a conclusion with that target. There may be multiple targets. There may be multiple laser apertures engaging with one or more different targets. Overall, then, there may be a rapidly changing, dynamic, situation where targets are being engaged in a rapidly changing manner in and amongst friendly assets and/or non-combatants. Such a situation, of course, increases the risk of an object other than the intended target being unintentionally exposed to the electromagnetic radiation that is generated and directed by a laser weapon system. That is, an object other than the intended target could inadvertently and/or unintentionally be targeted. It is of course desirable to avoid the situation.

According to an example embodiment, it has been realised that the risk of inadvertent and/or unintentional engaging or targeting of objects other than an intended target can be largely reduced or even avoided by employing a control system for the laser weapon system that is arranged to monitor a three-dimensional position of an object other than the target, and to control a mask to prevent generated electromagnetic radiation being directed at that object. So, for instance, it is already known to track and engage with a target using the laser weapon system. A relatively subtle but powerful modification of such a system is also to ensure that an object that is not to be targeted is also monitored and tracked. That object is simply masked out, so that it is simply not possible to inadvertently direct electromagnetic radiation toward and into contact with that object.

The masking could be a physical mask, where a physical object is used to block the generated electromagnetic radiation. Other physical principles may be used to otherwise deflect the electromagnetic radiation away from the particular object, for example by way of refraction, diffraction, or similar.

A physical or virtual (see below) mask could ensure that when the object would otherwise be engaged, the optics, or generated electromagnetic radiation, is automatically directed to a location other than that object.

A perhaps simpler and more straightforward implementation, and perhaps even more powerful, is to employ a virtual mask, where the masking is implemented in software or similar, so that it is simply not possible for the electromagnetic radiation to be directed at the object in the first place. For instance, this could be achieved by monitoring the object, and ensuring it is not possible to generate electromagnetic radiation when the laser optics are routing electromagnetic radiation via an aperture directed towards the object, for example by turning off one or more lasers, including all lasers, that would otherwise be generating electromagnetic radiation for the particular aperture(s) that is/are directed toward the object. This could be far safer and easier to manage than an implementation where a beam is deflected away from the target, where it could be hard to monitor the deflected electromagnetic radiation with regard to objects that could fall in the path of such deflection. Also, a virtual mask means that a physical stop does not need to be provided that is capable of withstanding all, or a significant portion, of the energy of the generated electromagnetic radiation.

Figure 6:
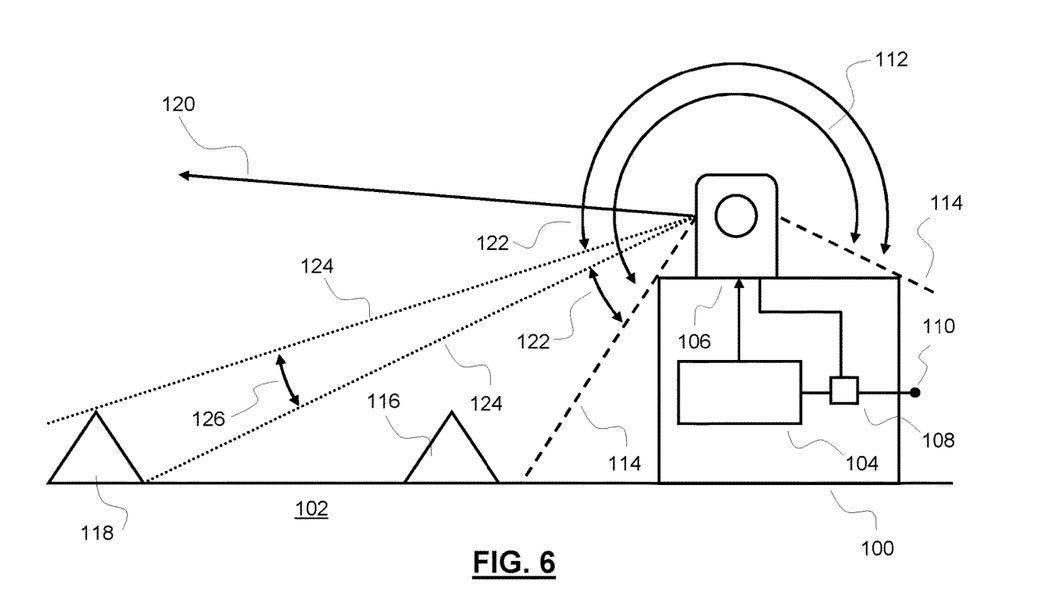
FIG. 6 schematically depicts a laser weapon system according to a further example embodiment.

FIG. 6 shows a platform 100, which in one example could take the form of a naval vessel, as described above. The platform 100 is located in a body of water 102. The platform 100 is provided with a laser weapon system according to an example embodiment. The laser weapon system comprises one or more lasers 104 capable of generating electromagnetic radiation, which can be routed to a laser aperture 106. A control system 108 can, as with other embodiments, control the steering or otherwise directing of the laser aperture 106 to successfully engage targets in the vicinity of the platform 100. The target can be tracked using one or more sensors 110, which may be proximate to the platform 100 (including forming a part of the platform), or which, in other embodiments, could be remote from the platform 100, all as described above.

The laser aperture 106 has a field of regard 112 within which an object can be targeted—i.e. electromagnetic radiation can be directed at objects within this field of regard 112 by the laser aperture 106. Mechanical stops or similar may be in place to prevent or otherwise limit 114 the field of regard 112 of an aperture 106 extending over or otherwise overlapping with the platform 100 itself, to prevent the laser aperture 106 causing damage to the platform 100 when generating electromagnetic radiation.

FIG. 6 shows a target 116 within a general field of regard 112 of the laser aperture 106. An object in the form of a friendly asset 118 is also shown as being within the general of field of regard 112 of the laser aperture 106. As described above, the laser aperture 106 may be used to direct electromagnetic radiation in the form of a laser beam or similar 120 at the target 116. However, as there is likely to be relative movement between the platform 100, laser aperture 106, target 116, and friendly asset or object 118, it is clearly possible that the directed electromagnetic radiation 120 could, unintentionally, be directed at the object 118. Clearly, this could be undesirable. Therefore, in this embodiment, the control system 108 is arranged to monitor (or be fed with monitoring data based on) a three-dimensional position of the object 118, and to control a mask to prevent generated electromagnetic radiation being directed at the object 118.

FIG. 6 shows how the mask may be achieved, at least at one particular instant in time. It can be seen that the general field of regard 112 of the laser aperture 106 is, in practice, prevented or otherwise modified from being fully implementable or realisable. In particular, the field of regard when the mask is implemented by the control system 108 is restricted 122 to provide (or by providing) a mask 124 that spans an angular extent or space 126 at least occupied by the object 118. Even though, in theory, electromagnetic radiation could be directed in this angular or otherwise spatial extent 126 by the laser aperture 106, the control system 108 prevents this from happening by way of the mask 124, which might be described as mechanical or virtual stops or limits, preventing the electromagnetic radiation being directed in this region or zone or space. The object is in a safer environment as a result of the mask 124.

The mask that is used can be established and implemented in one of a number of different ways. In order to establish the mask, the three-dimensional position of the object 118 will need to be in some ways determined, and likely in combination with the position of one or more targets. This can be achieved by one or more sensors 110 forming part of, or working in relation to, the platform or similar, or from another friendly platform or asset as described above. Similarly, the mask may be calculated by the controller, and will optionally be based on one or more of, or a combination of, position and/or dynamics of a platform which laser weapon forms a part of, of which the laser weapon is to be connected to: and/or position and/or dynamics of a target; and/or position and/or dynamics of one or more friendly assets and/or position and/or dynamics of one or more non-combatant; and/or environmental features such as terrain. In a related example, the control system could be fed with an already determined mask (calculated on the platform or remotely), and simply implement that mask.

Typically, the object that it is to be masked out will be a friendly asset or non-combatant, an environmental feature or even (as described below) the platform itself.

The masking could be implemented in hardware, for example with a mechanical, or optical, or electrical component being used in some way to stop or otherwise deflect the beam away from the object when, otherwise, the object would have electromagnetic radiation directed toward and into contact with it. The hardware could be moved, or its configuration otherwise changed, to implement the masking. However, a virtual mask is likely to be more suitable and flexible in practice. That is, rather than actually physically stopping or deflecting the generated electromagnetic radiation, it might be easier and simpler to control the masking in software, for example ensuring that it is not possible for the electromagnetic radiation to be generated when the laser apertures are directed or are to be directed at the object in question. This might most conveniently be achieved by preventing one or more lasers from generating electromagnetic radiation (at all, or to a harmful extent) when the object would otherwise be subjected to directed/incident electromagnetic radiation.

It will therefore be appreciated from the above that the control system 108 allows a target to be continuously tracked and engaged unless and until: the object that is not to be targeted is close to being located in-between a given laser aperture and the target; and/or the object is in-between a given laser aperture and the target. At this point, the object is masked to prevent electromagnetic radiation being directed at that object. In other words, the target might be continuously tracked with and engaged by the laser-generated electromagnetic radiation (e.g. laser energy being incident on the target), and the engagement (e.g. incidence of laser energy), and not necessarily the tracking (e.g. movement of the aperture), is interrupted when a laser aperture-target path is crossed, or about to be crossed, by the monitored object.

It will be appreciated that the exact masking may vary dependent on the start and shut down times of the laser system and so on. That is, the powering up and powering down of the lasers may be in some way staggered so that damage to any such monitored object is limited or avoided, but at the same time minimising the time for which the target cannot be successfully engaged. Many different factors may feed into these operating principles, for example the speed at which electromagnetic radiation is being swept around or about a space of the platform in order to successfully engage a target, the expected intensity and therefore potential damage to the object at the distance from the laser apertures, and so on. These are implementation details that will be understood and realised in a practical implementation. So, most important is the concept that has been generally described herein—masking out of an object that is not to be targeted and engaged with. The masking may be total, so that no electromagnetic radiation can be directed at the monitored object. This can be for the entire time for which the laser aperture-target path is crossed, or about to be crossed, by the monitored object, or could be for a reduced time, to limit (and not necessarily prevent) damage. The masking may be partial, so that the full extent of maximum possible generated electromagnetic radiation is not directed at the object. So, the amount of electromagnetic radiation can be reduced (partially or to zero) for the entire time for which the laser aperture-target path is crossed, or about to be crossed, by the monitored object, or could be for a reduced time, to limit (and not necessarily prevent) damage. In short, the masking is such that the generated electromagnetic radiation that is to be, or is being, directed at the target is at least partially reduced for the entire time for which the laser aperture-target path is crossed, or about to be crossed, by the monitored object, or for a reduced time, to limit (and not necessarily prevent) damage.

In another example embodiment, the masking of an object may lead to the laser weapon system being switched to engage a new target.

The masking concept can be used in relation to a single laser-laser aperture assembly, for example such as single assembly described above (in relation to the two assemblies of FIG. 2, or even the assembly of FIG. 1), or to a system employing fewer lasers or laser systems than there are sets of laser optics and laser apertures, where electromagnetic radiation is routed through the appropriate set of laser optics and laser apertures, again as described above (e.g. in relation to FIG. 3).

FIG. 6 showed how the general field of regard of a given laser aperture could be in some way limited to provide a mask to ensure that an object, such as a static or moveable object such as a friendly asset. non-combatant, or an environmental feature could be masked from inadvertently being targeted with electromagnetic radiation. In FIG. 6, the field of regard was mechanically limited from encompassing the platform 100 itself.

Figure 7:
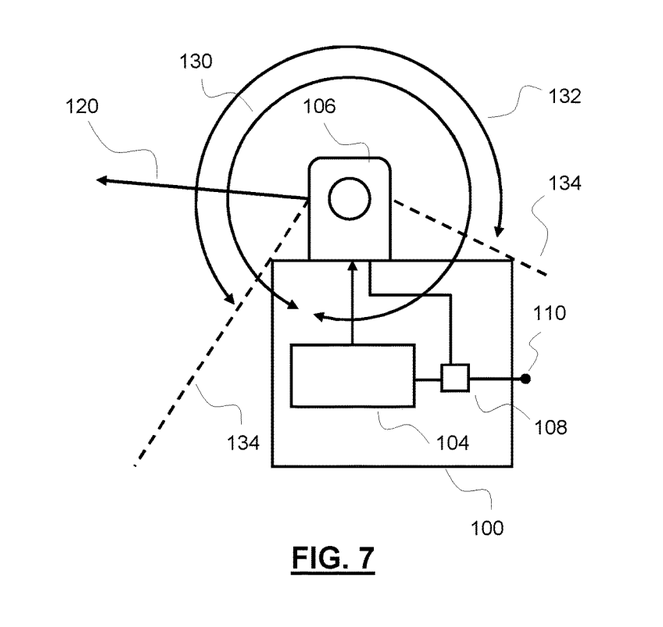
FIG. 7 schematically depicts additional or alternative principles associated with the operation of the embodiment of FIG. 6.

FIG. 7 shows that a field of regard 130 might not be limited by mechanical stops from encompassing the platform 100 itself. Instead, the masking described above in relation to non-combatant, friendly assets or environmental features may be additionally or alternatively be modified to include the platform 100 itself as the object to be masked. That is, the general field of regard 130 of the laser aperture 106 may be modified 132 to impose stops 134 which effectively mask out the platform 100 itself from being inadvertently targeted by the laser aperture 106. As above, the stops, limits or otherwise masking may be virtual or software-like in nature, or implemented using a hardware based mask.

As with all embodiments described herein, the laser weapon system of FIG. 6 or FIG. 7 may be useful as a standalone or newly manufactured or installed system. However, it is possible that existing laser weapon systems could have their control systems replaced or otherwise upgraded with the control methodology described above. That is, an existing system could be modified to employ a controller that is arranged to monitor (either directly, with sensors, or indirectly, using data fed to the controller) a three-dimensional position of an object other than the target of the laser weapon system, and to use a mask to prevent generated electromagnetic radiation being directed at the object.

Figure 8:
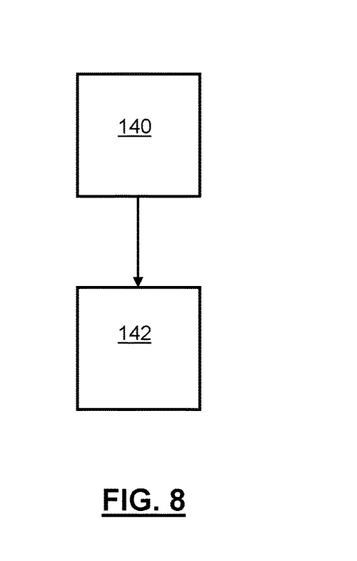
FIG. 8 schematically depicts methodology according to example embodiments.

FIG. 8 describes a general methodology associated with recently described embodiments. The method is for controlling a laser weapon system, and comprises monitoring a three-dimensional position of an object other than a target of the laser weapon 140. The monitoring could be undertaken directly, with sensors in connection with the control system, or indirectly, using data fed to the control system. The data could be or assist in detailing the mask, or could be data via which a mask is calculated. The method then comprises masking that object to prevent generated electromagnetic radiation being directed at that object 142. Of course, the method might also comprise controlling the laser weapon to engage that target and, as above, without engaging the monitored object.

As with the physical systems described above, the methodology described in relation to FIGS. 5 and 8 can be combined.

The described control systems may be implemented in hardware, or software, or a combination of hardware and software. The described control systems can calculate the probability and/or mask, or be fed with information for use in implementing actions as a result of an already calculated probability or mask. That is, the control system can calculate the probability and/or mask and take actions in relation to the probability and/or mask, or simply take actions after being fed with information relating to the probability and/or mask.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A laser weapon system, comprising:
a laser for generating electromagnetic radiation;
laser optics for directing the generated electromagnetic radiation via one of a plurality of laser apertures;
a plurality of laser apertures, each having an associated field of regard, and each being a final optical element in the laser weapon system through which the generated electromagnetic radiation exits the weapon; and
a control system;
wherein the control system is arranged to control through which combination of laser optics and laser aperture the generated electromagnetic radiation is directed to engage a target, based on a probability of successfully engaging that target in relation to the field of regard of a given laser aperture;
wherein the control system is arranged to monitor a three-dimensional position of an object other than the target, and to control a mask to prevent generated electromagnetic radiation being directed at that object;
wherein the mask is a physical mask for physically blocking or otherwise physically deflecting already generated electromagnetic radiation towards another target or a safe location, in order to at least limit generated electromagnetic radiation being directed at the object other than the target, and wherein the physical mask is in the path of the radiation between the aperture and the object other than the target; and
wherein, in order to determine the probability, the control system is arranged to receive sensory input from one or more sensors located proximate to the laser weapon system.

2. The laser weapon of claim 1, wherein the control system is arranged to control through which combination of laser optics and laser aperture the generated electromagnetic radiation is directed to engage the target, based on an increased or maximised probability of successfully engaging that target in relation to the field of regard of the laser aperture, when compared with one or more other laser apertures of the laser weapon system.

3. The laser weapon system of claim 1 comprising multiple lasers, wherein the control system is arranged to determine through which combination of laser, laser optics and laser aperture the generated electromagnetic radiation is routed to engage the target, based on a probability of successfully engaging that target in relation to the field of regard of the laser aperture of the combination.

4. The laser weapon system of claim 1, wherein the control system is arranged to route generated electromagnetic radiation to that particular aperture.

5. The laser weapon of claim 4, wherein the control system is arranged to route generated electromagnetic radiation to that particular laser aperture via the use of one or more moveable optical components.

6. The laser weapon system of claim 1, wherein in order to determine the probability, the control system is arranged to receive sensory input from one or more sensors of a platform which the laser weapon system forms a part of, or which the laser weapon system is connected to.

7. The laser weapon system of claim 1, wherein in order to determine the probability, the control system is arranged to receive sensory input from one or more sensors separate to a platform which the laser weapon system forms a part of, or separate to a platform which the laser weapon system is connected to.

8. The laser weapon system of claim 1, wherein the probability of successfully engaging that target is calculated by the controller, and is based on one or more of, or a combination of:
- position and/or dynamics of a platform which the laser weapon system forms a part of, or which the laser weapon system is connected to; and/or
- position and/or dynamics of the target; and/or
- position and/or dynamics of one or more friendly assets; and/or
- position and/or dynamics of one or more non-combatants; and
- position of one or more environmental features.

9. A control system for use with a laser weapon system, the laser weapon system comprising:
- a laser for generating electromagnetic radiation;
- laser optics for directing the generated electromagnetic radiation via one of a plurality of laser apertures;
- the plurality of apertures each having an associated field of regard, and each being a final optical element in the laser weapon system through which the generated electromagnetic radiation exits the weapon; and
- the control system is arranged to control through which combination of laser optics and aperture the generated electromagnetic radiation is directed to engage a target, based on a probability of successfully engaging that target in relation to the field of regard of the aperture of the combination;
- wherein the control system is arranged to monitor a three-dimensional position of an object other than the target, and to control a mask to prevent generated electromagnetic radiation being directed at that object;
- wherein the mask is a physical mask for physically blocking or otherwise physically deflecting already generated electromagnetic radiation towards another target or a safe location, in order to at least limit generated electromagnetic radiation being directed at the object other than the target, and wherein the physical mask is in the path of the radiation between the aperture and the object other than the target; and
- wherein, in order to determine the probability, the control system is arranged to receive sensory input from one or more sensors located proximate to the laser weapon system.

10. A method of controlling a laser weapon system, the laser weapon system comprising:
- a laser for generating electromagnetic radiation;
- laser optics for directing the generated electromagnetic radiation via one of a plurality of apertures;
- the plurality of apertures each having an associated field of regard, and each being a final optical element in the laser weapon system through which the generated electromagnetic radiation exits the weapon; and the method comprising:
- controlling through which combination of laser optics and aperture the generated electromagnetic radiation is directed to engage a target, based on a probability of successfully engaging that target in relation to the field of regard of the aperture of the combination;
- wherein the control system is arranged to monitor a three-dimensional position of an object other than the target, and to control a mask to prevent generated electromagnetic radiation being directed at that object;
- wherein the mask is a physical mask for physically blocking or otherwise physically deflecting already generated electromagnetic radiation towards another target or a safe location, in order to at least limit generated electromagnetic radiation being directed at the object other than the target, and wherein the physical mask is in the path of the radiation between the aperture and the object other than the target; and
- wherein, in order to determine the probability, the control system is arranged to receive sensory input from one or more sensors located proximate to the laser weapon system.

* * * * *